(12) United States Patent  (10) Patent No.: US 7,846,081 B2
Itoh et al.  (45) Date of Patent: Dec. 7, 2010

(54) METHOD FOR PRODUCING MOTORIZED ROLLER AND MOTORIZED ROLLER PRODUCED BY THE METHOD

(75) Inventors: Tetsuya Itoh, Kasai (JP); Masaki Ikeda, Kasai (JP)

(73) Assignee: Itoh Denki Co., Ltd. (JP)

( * ) Notice: Subject to any disclaimer, the term of this patent is extended or adjusted under 35 U.S.C. 154(b) by 1082 days.

(21) Appl. No.: 11/583,400

(22) Filed: Oct. 18, 2006

(65) Prior Publication Data

US 2007/0099781 A1 May 3, 2007

(30) Foreign Application Priority Data

Oct. 27, 2005 (JP) ............................. 2005-312325

(51) Int. Cl.
*B25F 5/02* (2006.01)
(52) U.S. Cl. ...................................................... 492/60
(58) Field of Classification Search ................. 492/15, 492/60; 198/788, 789, 835, 791
See application file for complete search history.

(56) References Cited

U.S. PATENT DOCUMENTS 5,893,821 A 4/1999 Ando et al.
6,672,449 B2 * 1/2004 Nakamura et al. .......... 198/788

FOREIGN PATENT DOCUMENTS

DE 20003777 U1 12/2000
JP 2003054732 A 2/2003

* cited by examiner

*Primary Examiner*—John C Hong
(74) *Attorney, Agent, or Firm*—Wood, Phillips, Katz, Clark & Mortimer

(57) ABSTRACT

A method for producing a motorized roller formed by accommodating a motor in a roller body so that the roller body is rotated when being driven by the motor, including the steps of: providing at least one elastic body; providing a bag for accommodating the elastic body; inserting the elastic body into the bag; removing air from the bag; inserting the bag accommodating the elastic body into a cavity of the roller body; and taking air in the bag so as to expand the elastic body so that the cavity is filled with the bag accommodating the elastic body.

16 Claims, 5 Drawing Sheets

METHOD FOR PRODUCING MOTORIZED ROLLER AND MOTORIZED ROLLER PRODUCED BY THE METHOD

BACKGROUND OF THE INVENTION

1. Field of the Invention

The present invention relates to a motorized roller formed by accommodating a driving motor and other components in a roller body so that the roller itself is rotatable, and a method for producing the same.

2. Description of Related Art

A motorized roller for use in a device such as a conveyor is conventionally used in various places. Especially, in the case that the roller is used in a place with an extreme temperature swings (such as the vicinity of a refrigerator door), substantial amount of water builds up dew condensation in a cavity of a roller body. Further, the longer the roller body becomes, the larger the cavity becomes, resulting in increased amount of water building up dew condensation in the cavity. The dew condensation in the cavity has harmful effects on a motor or other components within the roller body, causing breakdown and rusting.

Further, when an article is conveyed by a conveyor, the cavity in the roller body increases reverberation caused by collision between the article and the roller. Such noise worsens working conditions.

Reduction of the volume of the cavity in the roller body eliminates such dew condensation and noise. Therefore, the conventional motorized roller has urethane foam filled within the roller body as a filler so as to reduce the cavity in the roller body as much as possible to prevent generation of dew condensation. Having heat insulating properties, urethane foam prevents rapid change in temperature, also helping avoid dew condensation within the roller body in this regard. When the filler is filled in the roller body, the filler having substantially the same outer diameter as the inner diameter of the roller body has been conventionally pressed into the body.

A structure of dew condensation prevention within a roller of a roller conveyor is disclosed in JP 2003-054732A, and a structure of noise prevention for a roller conveyor is disclosed in JP S61-32113U and JP S51-163282U.

DISCLOSURE OF THE INVENTION

Problem to be Solved by the Invention

FIG. 7 is an enlarged perspective view of a principal part of a step of pressing elastic bodies 3 into inside of a roller body 5 of a motorized roller A, not using a producing method relating to the present invention. As a filler made of urethane foam is subject to deformation at the end of a roller body when being pressed into the body, the deformed part is liable to be caught by the end of the roller body. Further, since the outer peripheral surface of the filler contacts with the inner peripheral surface of the roller body, frictional force acts in a direction opposite to a direction of the filler pressed into the body. Still further, in the case of pressing a plurality of fillers into the body, frictional force acts among the fillers. Thus, there is such a problem as low workability to press and fill a filler into a roller body without any modification.

It is accordingly an object of the present invention to improve workability when a filler is filled into inside of a roller body of a motorized roller.

Means to Solve the Problem

In order to solve the problems and drawbacks described above, an aspect of the present invention provided herein is a method for producing a motorized roller formed by accommodating a motor in a roller body so that the roller body is rotated when being driven by the motor, including the steps of a step of providing at least one elastic body, a step of providing a bag for accommodating the elastic body, a step of inserting the elastic body into the bag, a step of removing air from the bag, a step of inserting the bag accommodating the elastic body into a cavity of the roller body, and a step of taking air in the bag so as to expand the elastic body so that the cavity is filled with the bag accommodating the elastic body.

Removal of air from the bag accommodating the elastic body compresses the elastic body, thereby making the outer diameter of a filler consisting of the bag and the elastic body smaller than the inner diameter of the roller body. Therefore, when the bag accommodating the elastic body is filled into inside of the roller body, the outer peripheral surface of the bag does not contact with the inner peripheral surface of the roller body, so that frictional force does not act on the bag, and thus it is not necessary to press the bag accommodating the elastic body into the roller body. Further, the bag is expected to be made of vinyl resin, which will generate smaller friction force than urethane foam. Thus, even in the case that the filler comes into contact with the inner peripheral surface of the roller body in insertion, big frictional force does not act on the filler.

Another aspect of the invention provided herein to solve the similar problems and drawbacks is a method for producing a motorized roller formed by accommodating a motor in a roller body so that the roller body is rotated when being driven by the motor, including the steps of a step of providing a filler including at least one elastic body and an airtight flexible outer packaging accommodating the elastic body, a step of inserting the filler into the roller body with the elastic body in a compressed state, and a step of taking gas in the outer packaging so as to expand the elastic body.

A resinous bag is expected to be the airtight outer packaging. Resin sheets can be also used as the outer packaging. For example, the outer packaging can be constituted by wrapping an elastic body in a large resin sheet or by sandwiching an elastic body between two resin sheets one above the other with their periphery adhered by heat.

The bag or the outer packaging has an opening through which air is removed, and the opening can be sealed by an appropriated sealing means. It is also possible to take air in the bag or the outer packaging by breakage of a part of the bag or release of the sealing means.

That improves working steadiness.

It is also recommended that the elastic body to be accommodated in the bag is selected from rolled sheet-like one and hollow cylindrical one.

According to this aspect, even though the elastic body is made of a material such as closed cell polyethylene foam, the elastic body has space communicating with outside, so as to be compressible and be expected to have appropriate resilient nature.

The elastic body is preferably made of a spongy material.

Further, the elastic body may have a blocky shape or a granular shape. When the elastic body has a blocky shape, it is recommended to be of a columnar shape so as to be in conformity with a cross section of the roller body.

Further, the bag or the outer packaging may accommodate a plurality of elastic bodies.

The motorized roller produced by the method described above hardly builds up dew condensation and has a long life.

The invention relates to a motorized roller formed by accommodating a motor in a roller body so that the roller body is rotated when being driven by the motor, including at least one elastic body and a bag for accommodating the elastic body, characterized in that the roller body has a cavity and that the cavity is filled with the bag accommodating the elastic body.

According to this invention, the bag of the filler functions as a partition within the roller body. Even if dew condensation is built up within the bag, its dew is held back inside the bag, so that the dew does not flow into the motor or other components incorporated in the motorized roller. If and when the opening of the bag is exposed to a direction opposite to the motor or other components, the dew generated by condensation adjacent to the opening never gets through the bag since the elastic body holds the bag, so that the dew never flows into the motor or the other components positioned opposite to the opening. That avoids breakdown of the components.

The producing method in the present invention improves workability when the filler is filled into inside of the roller body of the motorized roller. Further, the motorized roller in the present invention facilitates dew condensation prevention and noise prevention.

DESCRIPTION OF THE PREFERRED EMBODIMENTS

Figure 1:
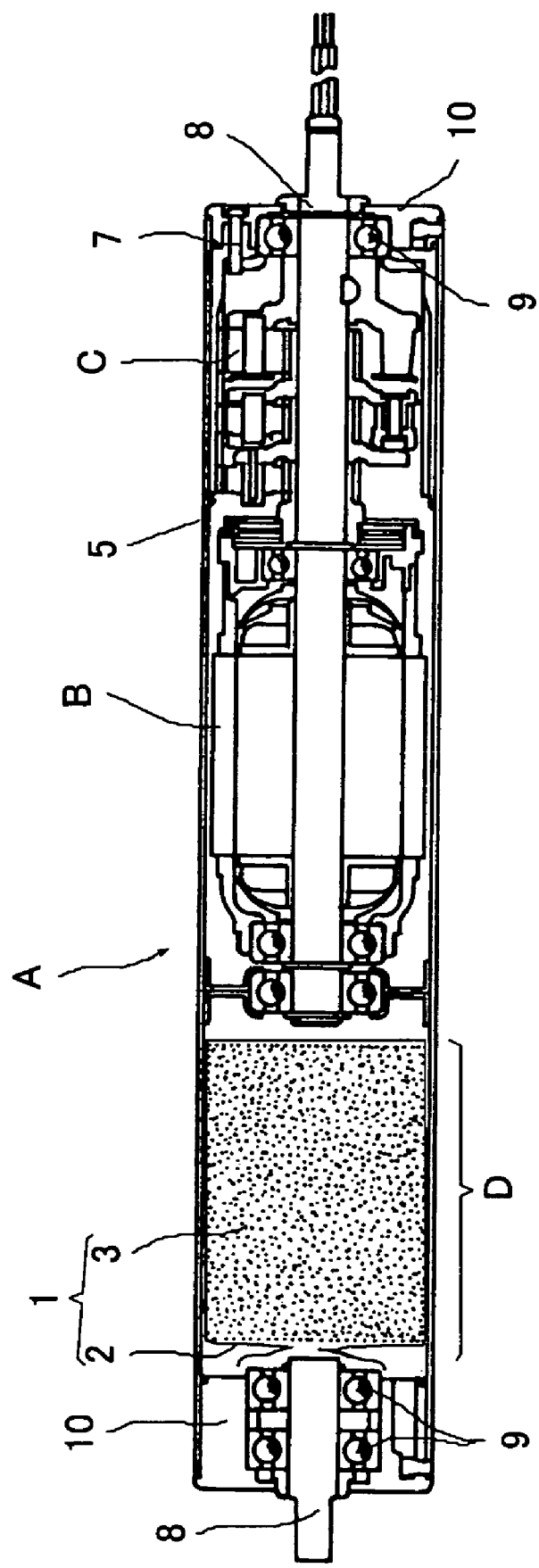
FIG. 1 is a sectional view of a motorized roller filled with a bag and an elastic body accommodated in the bag within a cavity in a roller body of the roller.

Now, a preferred embodiment of the present invention will be described below, making reference to the accompanying drawings. FIG. 1 is a sectional view of a motorized roller A filled with a bag (viz. outer packaging) 2 and an elastic body 3 accommodated in the bag 2 within a cavity D in a roller body 5 of the roller A. As shown in FIG. 1, the motorized roller A is formed by accommodating a motor B and other components such as a reducer C in the roller body 5 and provided with a supporting shaft 8 and closing members 10 and 10. The roller body 5 is a metallic hollow cylinder opening at both ends, which are sealed by the closing members 10 and 10. The motor B uses an outer rotor motor. The reducer C is constituted by a train of planet gears. Rotation of the motor B is reduced by the reducer C and transferred to the roller body 5 via an output section 7, so as to rotate the roller body 5. The cavity D is formed from space inside the roller body 5 except the components such as the motor B and the reducer C and the closing members 10 and 10. A filler 1 is filled into the cavity D.

Figure 2:
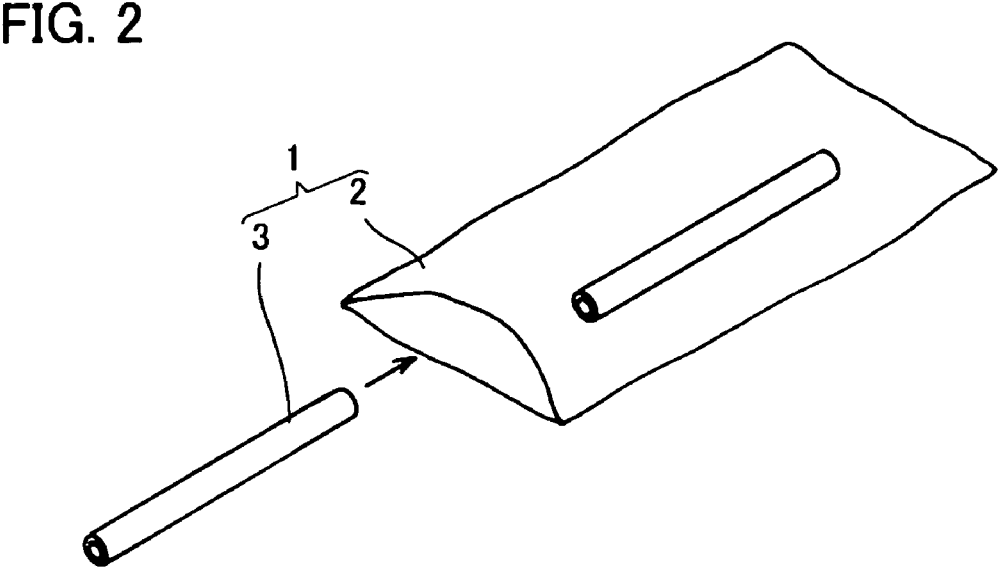
FIG. 2 is a perspective view of a first step of inserting the elastic bodies into the bag in the invention of a method for producing the motorized roller.

FIG. 2 is a perspective view of a first step of inserting the elastic bodies 3 into the bag 2 in the invention of the method for producing the motorized roller A. As shown in FIG. 2, the filler 1 consists of the bag 2 and the elastic bodies 3, and in the first step, the elastic bodies 3 are inserted into the bag 2. The bag 2 is expected to be made of polyvinyl resin, but the present invention is not limited thereto. Specifically, for example, an airtight flexible material such as polyethylene resin or polypropylene resin can be suitably employed.

FIGS. 6A to 6D are perspective views illustrating various shapes of the elastic bodies 3 accommodated in the bag 2. The filler 1 including the elastic body 3 is preferably larger in volume than the cavity D under natural circumstances so that the volume of the cavity D in the roller body 5 is reduced as much as possible. Further, it is necessary in a compressed state that the outer diameter of the filler 1 becomes shorter than the inner diameter of the roller body 5 and smaller in volume than the cavity. There is no special limitation relating to a size, a shape, and the number of the elastic body 3, as long as these conditions are fulfilled. The elastic body 3 may be formed by only one block of a columnar shape in circular cross section or by a number of granular resins.

Figure 6A:
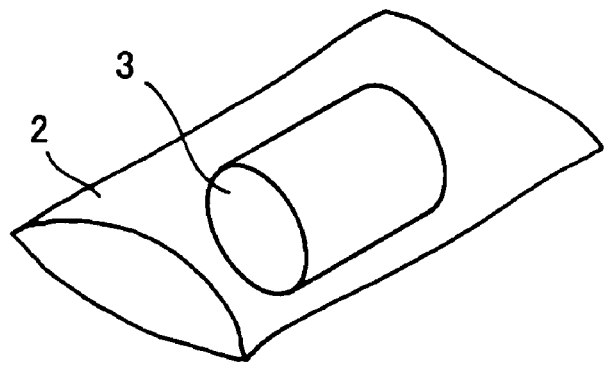
FIGS. 6A to 6D are perspective views illustrating various shapes of the elastic bodies accommodated in the bag, FIG. 6A showing an elastic body having a columnar shape, FIG. 6B showing other elastic bodies formed by small pieces, FIG. 6C showing still other elastic bodies each having a tubular shape, and FIG. 6D showing yet another elastic body formed by a rolled sheet.
Figure 6B:
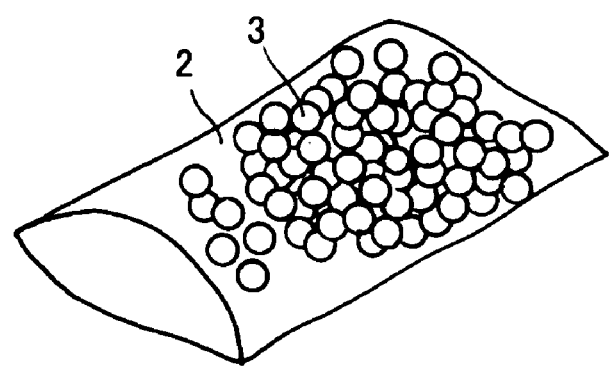
Figure 6C:
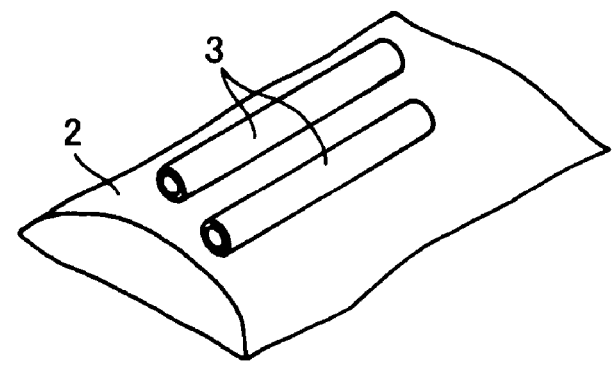
Figure 6D:
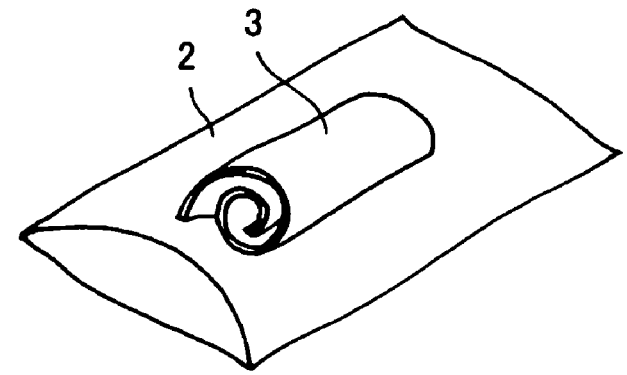
Figure 7:
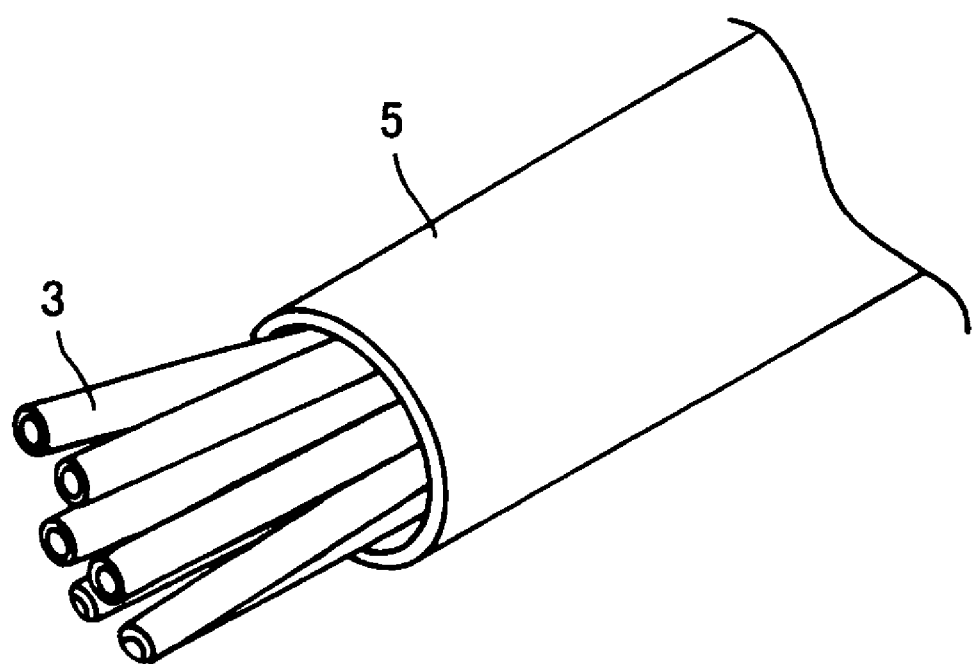
FIG. 7 is an enlarged perspective view of a principal part of a step of pressing an elastic body into inside of the roller body of the motorized roller, not using the method relating to the present invention.

For example, the elastic body (or bodies) 3 may be of a columnar shape having the same cross section as that of the cavity D in the roller body 5 (FIG. 6A) or formed by small pieces (FIG. 6B). Further, a plurality of the elastic bodies 3 may be accommodated in the bag 2 (FIGS. 6B and 6C).

The elastic body is preferably made of a spongy material. Specifically, a spongy material such as interconnected cell polyurethane foam is expected, but the present invention is not limited thereto. More specifically, a material such as interconnected cell polyethylene foam that is compressible by removing air and has resilient nature is suitable. However, even if closed cell polyethylene foam is used as the material, the elastic body 3 of a tubular shape (FIG. 6C) or of a rolled sheet (FIG. 6D), for example, creates space through which the elastic body 3 communicates with outside, so as to be compressible and be expected to have appropriate resilient nature.

Figure 3:
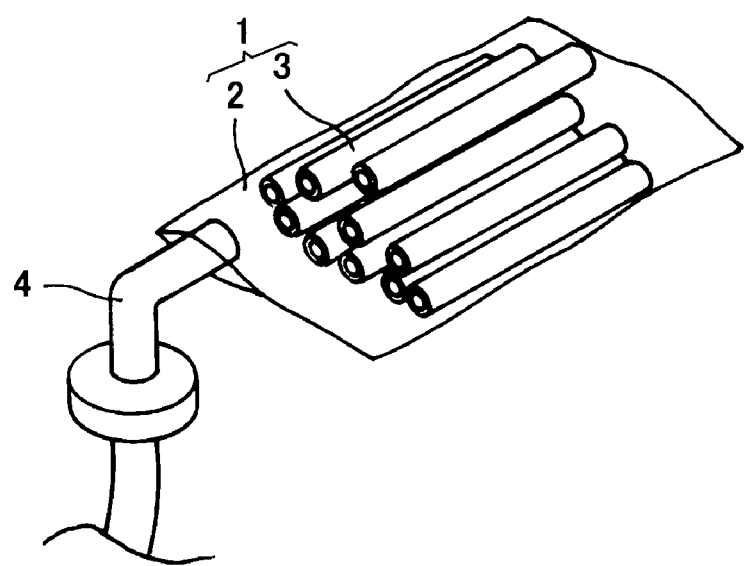
FIG. 3 is a perspective view of a second step of removing air from the bag in the invention of the method.

FIG. 3 is a perspective view of a second step of removing air from the bag 2 in the invention of the method for producing the motorized roller A. As shown in FIG. 3, air is removed from the bag 2 in the second step. An evacuator 4 such as an electric vacuum cleaner is expected to be a means of removing air. Air should be removed until the elastic bodies 3 are compressed so that the outer diameter of the filler 1 becomes smaller than the inner diameter of the roller body 5. If and when the bag 2 is evacuated, the inner peripheral surface of its opening mutually sticks fast as the bag 2 is airtight, thereby ensuring that inflow of air from the opening is shut off. That keeps the compressed state of the elastic body 3. However, in the case that the resilient nature of the elastic body 3 is strong or that a predetermined time has passed after removing of air from the bag 2, air may flow into the bag 2 through the opening, resulting in spoiling the compressed state of the elastic body 3. In such a case, sealing of the opening by heat adhesion or by a sealing means 6 such as a fastener or a clip keeps the compressed state.

Figure 4:
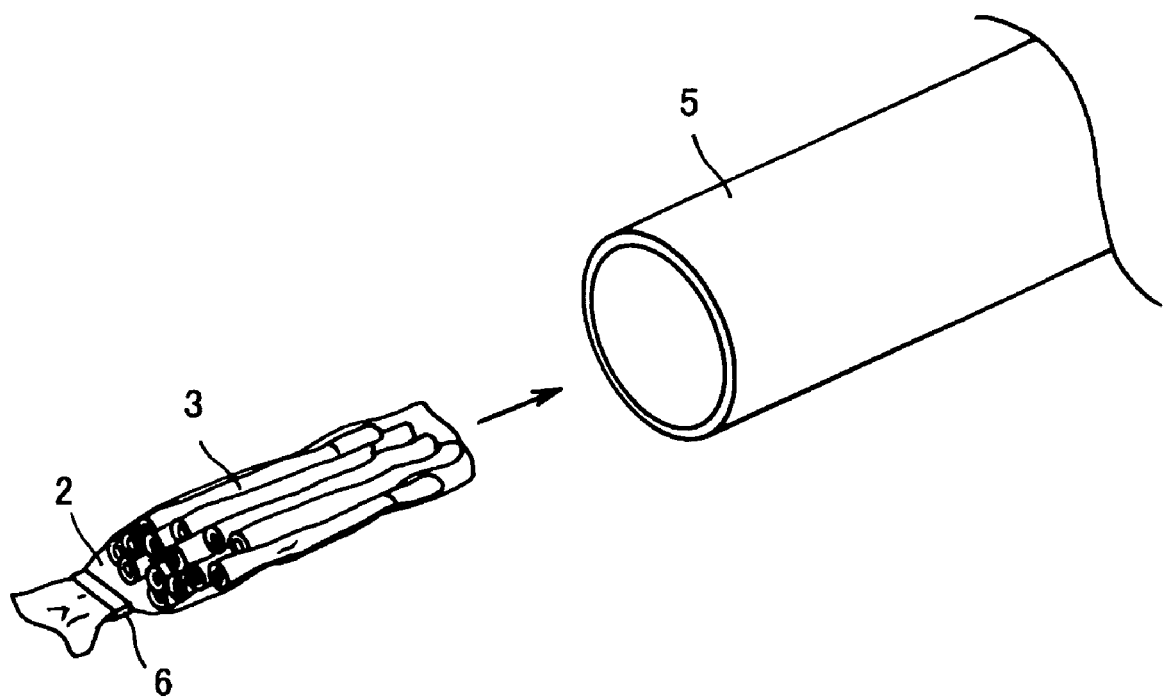
FIG. 4 is a perspective view of a third step of inserting the bag accommodating the elastic bodies into the cavity in the roller body in the invention of the method.

FIG. 4 is a perspective view of a third step of inserting the bag 2 accommodating the elastic bodies 3 into the cavity D in the roller body 5 in the invention of the method for producing the motorized roller A. As shown in FIG. 4, the filler 1 in which the elastic body has been compressed by removing air from the bag 2 is inserted into the cavity D in the roller body 5 in the third step. At this time, the outer diameter of the filler 1 is smaller than the inner diameter of the roller body 5, so that friction force does not act on the filler 1 in insertion, and thus, it is not necessary to press the filler 1 into the roller body 5. That facilitates inserting the filler 1 into the roller body 5.

Figure 5:
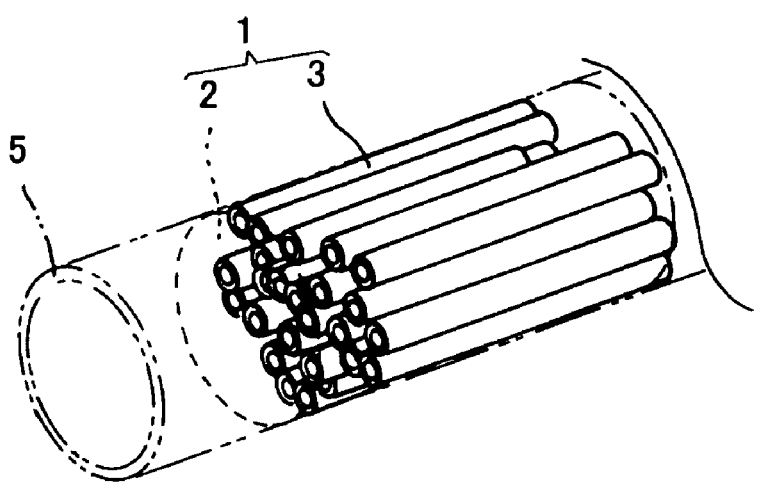
FIG. 5 is an enlarged perspective view of a principal part of a fourth step of taking air in the bag so as to expand the elastic body so that the cavity is filled with the bag accommodating the elastic body in the invention of the method.

FIG. 5 is an enlarged perspective view of a principal part of a fourth step of taking air in the bag 2 so as to expand the elastic bodies 3 so that the cavity D is filled with the bag 2 accommodating the elastic bodies 3 in the invention of the method for producing the motorized roller A. As shown in FIG. 5, the filler 1 is inserted up to a predetermined position inside the roller body 5, whereupon air is taken in the bag 2 so as to expand the elastic body 3, so that the filler is filled within the roller body 5. Air may be taken in the bag 2 by opening the opening of the bag 2, breaking a part of the bag 2, or releasing of the sealing means 6 such as a fastener or a clip. A part of the bag 2 may be broken by making a hole by pricking the bag 2 with a sharp-pointed body such as a needle or by slashing with a cutter such as a knife.

The above-mentioned embodiments employ the bag 2 as the outer packaging, but may employ one in which the elastic bodies 3 are sandwiched between two sheets with the periphery of the sheets around the elastic bodies 3 adhered after depressurization of space between the two sheets.

Air within the bag 2 may be removes by pressing the elastic body 3 from outside of the bag 2 so as to compress the elastic body 3, instead of vacuuming up the air as described in the above-mentioned embodiments. According to this method, air in the bag 2 is pushed out by external pressure.

The present application is based on, and claims priority from, Japanese Application Serial Number 2005-312325, filed Oct. 27, 2005, the disclosure of which is hereby incorporated by reference herein in the entirety.

The invention claimed is:

1. A method for producing a motorized roller formed by accommodating a motor in a roller body so that the roller body is rotated when being driven by the motor, comprising the steps of:
   a step of providing at least one elastic body;
   a step of providing a bag for accommodating the elastic body;
   a step of inserting the elastic body into the bag;
   a step of removing air from the bag;
   a step of inserting the bag accommodating the elastic body into a cavity of the roller body; and
   a step of taking air in the bag so as to expand the elastic body so that the cavity is filled with the bag accommodating the elastic body.

2. The method as defined in claim 1,
   wherein the bag has an opening through which air is removed,
   wherein the opening of the bag is sealed by a sealing means, and
   wherein the step of taking air in the bag is performed by means of one selected from breakage of a part of the bag and release of the sealing means.

3. The method as defined in claim 1,
   wherein the elastic body to be accommodated in the bag is one selected from rolled sheet-like one and hollow cylindrical one.

4. The method as defined in claim 1,
   wherein the elastic body is made of a spongy material.

5. The method as defined in claim 1, wherein the elastic body has a blocky shape.

6. The method as defined in claim 1, wherein the elastic body has a columnar shape.

7. The method as defined in claim 1, wherein the bag accommodates a plurality of elastic bodies.

8. A motorized roller produced by the method as defined in claim 1 wherein the bag with the elastic body therein resides within the cavity.

9. A method for producing a motorized roller formed by accommodating a motor in a roller body so that the roller body is rotated when being driven by the motor, comprising the steps of:
   a step of providing a filler comprising at least one elastic body and an airtight flexible outer packaging accommodating the elastic body;
   a step of inserting the filler into the roller body with the elastic body in a compressed state; and
   a step of taking gas in the outer packaging so as to expand the elastic body.

10. The method as defined in claim 9, further comprising a step of breaking a part of the outer packaging so as to take air in the outer packaging.

11. The method as defined in claim 9, wherein the elastic body is one selected from a rolled sheet and one formed into a hollow cylinder.

12. The method as defined in claim 9, wherein the elastic body is made of a spongy material.

13. The method as defined in claim 9, wherein the elastic body has a blocky shape.

14. The method as defined in claim 9, wherein the elastic body has a columnar shape.

15. The method as defined in claim 9, wherein the outer packaging accommodates a plurality of elastic bodies.

16. A motorized roller produced by the method as defined in claim 9 wherein the airtight flexible outer packaging accommodating the elastic body resides with the elastic body in the roller body.

* * * * *